(12) United States Patent
Subbaraya et al.

(10) Patent No.: US 11,386,687 B2
(45) Date of Patent: Jul. 12, 2022

(54) SYSTEM AND METHOD FOR RECONSTRUCTING AN IMAGE

(71) Applicant: Wipro Limited, Bangalore (IN)

(72) Inventors: Prashanth Krishnapura Subbaraya, Bengaluru (IN); Raghavendra Hosabettu, Bangalore (IN)

(73) Assignee: Wipro Limited, Bangalore (IN)

( * ) Notice: Subject to any disclaimer, the term of this patent is extended or adjusted under 35 U.S.C. 154(b) by 262 days.

(21) Appl. No.: 16/858,880

(22) Filed: Apr. 27, 2020

(65) Prior Publication Data

US 2021/0303840 A1 Sep. 30, 2021

(30) Foreign Application Priority Data

Mar. 30, 2020 (IN) .............................. 202041013799

(51) Int. Cl.
*G06V 30/414* (2022.01)
*G06V 30/148* (2022.01)
(Continued)

(52) U.S. Cl.
CPC .......... *G06V 30/414* (2022.01); *G06V 30/153* (2022.01); *G06V 30/413* (2022.01); *G06V 30/416* (2022.01)

(58) Field of Classification Search
CPC .. G06V 30/153; G06V 30/413; G06V 30/414; G06V 30/416; G06V 30/1463; G06V 20/695
See application file for complete search history.

(56) References Cited

U.S. PATENT DOCUMENTS 5,590,224 A 12/1996 Fast et al.
6,233,354 B1 3/2001 Nakatani
(Continued)

FOREIGN PATENT DOCUMENTS

CN 101593276 B 10/2011
EP 2545499 B1 1/2020

OTHER PUBLICATIONS

Chung (Computer English Translation of Korean Patent No. KR-10-0259803 B1), pp. 1-5. (Year: 2000).*

*Primary Examiner* — Daniel G Mariam
(74) *Attorney, Agent, or Firm* — Finnegan, Henderson, Farabow, Garrett & Dunner, LLP (57) ABSTRACT

This disclosure relates generally to image processing, and more particularly to method and system for reconstructing an image. In one embodiment, the method includes pre-processing an input image to generate character images corresponding to characters in the input image, determining a local character thickness threshold value for each character image, determining a global character thickness threshold value for the input image based on the local character thickness threshold values for the character images, and reconstructing each character image based on the local character thickness threshold value for each character image and the global character thickness threshold value to generate reconstructed character images. The local character thickness threshold value in a character image may be based on a set of character pixel values in a pre-determined number of segments in the character image. The method further includes re-constructing the input image based on the reconstructed character images.

20 Claims, 6 Drawing Sheets

(51) Int. Cl.
*G06V 30/413* (2022.01)
*G06V 30/416* (2022.01)

(56) References Cited

U.S. PATENT DOCUMENTS

2012/0242897 A1* 9/2012 Chattopadhyay ...... G06V 20/62
　　　　　　　　　　　　　　　　　　　　　　348/467
2019/0279016 A1　9/2019　Takabayashi

* cited by examiner

SYSTEM AND METHOD FOR RECONSTRUCTING AN IMAGE

TECHNICAL FIELD

This disclosure relates generally to image processing, and more particularly to method and system for reconstructing an image.

BACKGROUND

Extracting data (e.g., text, numbers, symbols, etc.) from digital images (e.g., filled forms, digital documents, etc.) and building meaningful information from the extracted data is a complex and time consuming task as a number of different text, numbers, and symbols are essentially required to be identified and correlated. Typically, such data extraction and information building are done manually and are prone to human errors. More recently, computer-based systems have been employed to automatically extract data and build meaningful information from digital images. Many of such systems employ optical character recognition (OCR) techniques for extraction of data from the digital images.

OCR is a computer-based translation of a digital image, comprising meaning text, into digital form as machine-editable text (i.e., text data). The OCR process, therefore, eliminates the need to manually type the document into the computer system. Many of the existing OCR techniques require high quality input image to accurately identify and recognize the characters from a text in the digital image so as to generate text data. However, some images may be of low quality (e.g., distorted image) and, therefore, hard to process and get high text conversion accuracy. High accuracy may be critical for important and sensitive documents including, but not limited to, documents with legal or financial information. Hence, it is crucial to improve quality of the input image prior to performing OCR.

Existing image processing techniques, to improve quality of the input image for OCR, are limited in their scope and utility. For example, existing image processing techniques should provide for detection and correction of skew, varying image registration, inverse type, shading and lines, etc., while at the same time should provide for protection of characters in the image. Further, for example, existing image processing techniques provide for reconstruction of a character based on an area utilized by a standard value. Such techniques do not differentiate between bold and normal character. Moreover, for example, some of the existing image processing techniques involve a dictionary of characters from a set of languages to reconstruct. Such techniques need to update its dictionary upon encountering new fonts.

SUMMARY

In one embodiment, a system for reconstructing an image is disclosed. In one example, the system may include at least one processor and a memory communicatively coupled to the at least one processor. The memory may store processor-executable instructions, which, on execution, may cause the processor to pre-process an input image to generate a plurality of character images. Each of the plurality of character images may correspond to a character in the input image. The processor-executable instructions, on execution, may further cause the processor to determine a local character thickness threshold value for each of the plurality of character images. The local character thickness threshold value in a character image may be based on a set of character pixel values in a pre-determined number of segments in the character image. The processor-executable instructions, on execution, may further cause the processor to determine a global character thickness threshold value for the input image based on the local character thickness threshold value for each of the plurality of character images. The processor-executable instructions, on execution, may further cause the processor to reconstruct each of the plurality of character images, based on the local character thickness threshold value for each of the plurality of character images and the global character thickness threshold value, to generate a plurality of reconstructed character images.

In one embodiment, a method for reconstructing an image is disclosed. In one example, the method may include pre-processing an input image to generate a plurality of character images. Each of the plurality of character images may correspond to a character in the input image. The method further may include determining a local character thickness threshold value for each of the plurality of character images. The local character thickness threshold value in a character image may be based on a set of character pixel values in a pre-determined number of segments in the character image. The method may further include determining a global character thickness threshold value for the input image based on the local character thickness threshold value for each of the plurality of character images. The method may further include reconstructing each of the plurality of character images, based on the local character thickness threshold value for each of the plurality of character images and the global character thickness threshold value, to generate a plurality of reconstructed character images.

In one embodiment, a non-transitory computer-readable medium storing computer-executable instructions for reconstructing an image is disclosed. In one example, the stored instructions, when executed by a processor, may cause the processor to perform operations including pre-processing an input image to generate a plurality of character images. Each of the plurality of character images may correspond to a character in the input image. The operations may further include determining a local character thickness threshold value for each of the plurality of character images. The local character thickness threshold value in a character image may be based on a set of character pixel values in a pre-determined number of segments in the character image. The operations may further include determining a global character thickness threshold value for the input image based on the local character thickness threshold value for each of the plurality of character images. The operations may further include reconstructing each of the plurality of character images, based on the local character thickness threshold value for each of the plurality of character images and the global character thickness threshold value, to generate a plurality of reconstructed character images.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
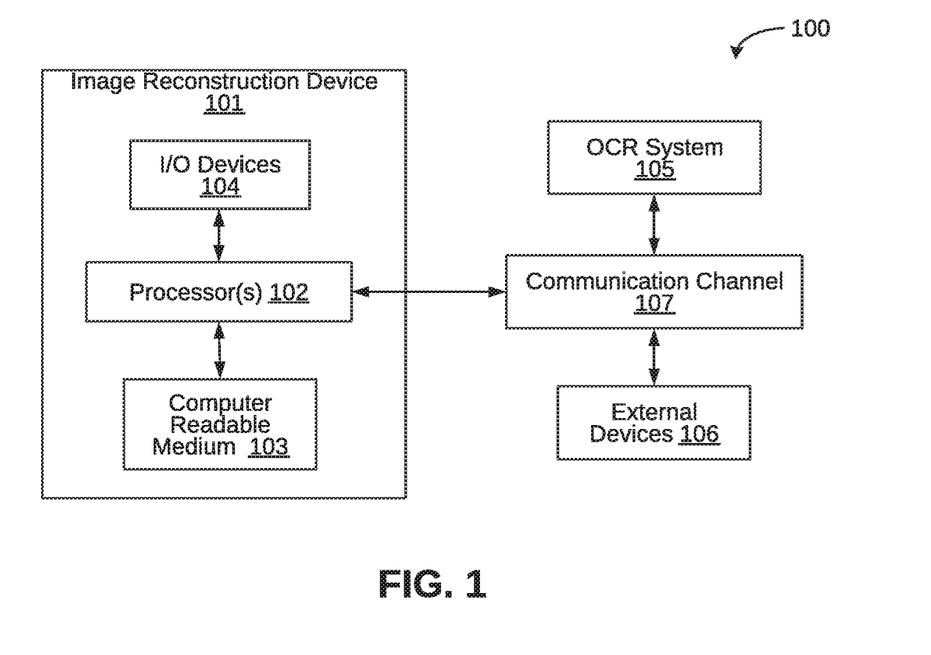
FIG. 1 is a block diagram of an exemplary system for reconstructing an image, in accordance with some embodiments of the present disclosure.

Referring now to FIG. 1, an exemplary system 100 for reconstructing an image is illustrated, in accordance with some embodiments of the present disclosure. In particular, the system 100 may include an image reconstruction device 101 for performing image reconstruction so as to remove any distortion and improve image quality. As will be appreciated, such improved images may be required for a wide variety of applications, such as, for optical character recognition (OCR).

As will be described in greater detail in conjunction with FIGS. 2-5, the image reconstruction device 101 may pre-process an input image to generate character images corresponding to characters in the input image, determine a local character thickness threshold value for each character image, determine a global character thickness threshold value for the input image based on the local character thickness threshold values for the character images, and reconstruct each character image based on the local character thickness threshold value for each character image and the global character thickness threshold value. The image reconstruction device 101 may determine the local character thickness threshold value in a character image based on a set of character pixel values in a pre-determined number of segments in the character image. Further, the image reconstruction device 101 may re-constructing the input image, based on the reconstructed character images, to generate an improved input image.

The image reconstruction device 101 may include but may not be limited to, server, desktop, laptop, notebook, netbook, smartphone, and mobile phone. In particular, the image reconstruction device 101 may include one or more processors 102, a computer-readable medium (e.g. a memory) 103, and input/output devices 104. The computer-readable medium 103 may store the instructions that, when executed by the processors 102, cause the one or more processors 102 to reconstruct an image and, therefore, improve quality of the image, in accordance with aspects of the present disclosure. The computer-readable medium 103 may also store various data (e.g. input images, binarized images, word images, character images, position indices of characters, local character thickness threshold values, global character thickness threshold value, improved character images, improved image, etc.) that may be captured, processed, and/or required by the image reconstruction device 101.

The image reconstruction device 101 may interact with a user (not shown) via input/output devices 104. For example, the image reconstruction device 101 may interact with the user via a user interface (not shown) accessible via the display device (not shown). Further, the image reconstruction device 101 may interact with an OCR system 105 over a communication network 107. Thus, the image reconstruction device 101 may provide improved images to the OCR system 105, which may the perform OCR on the improved image. The image reconstruction device 101 may further interact with one or more external devices 106 over the communication network 107 for sending and receiving various data (e.g., improved character images, improved images, etc.). The one or more external devices 106 may include, but may not be limited to, a remote server, a digital device, or another computing system.

Figure 2:
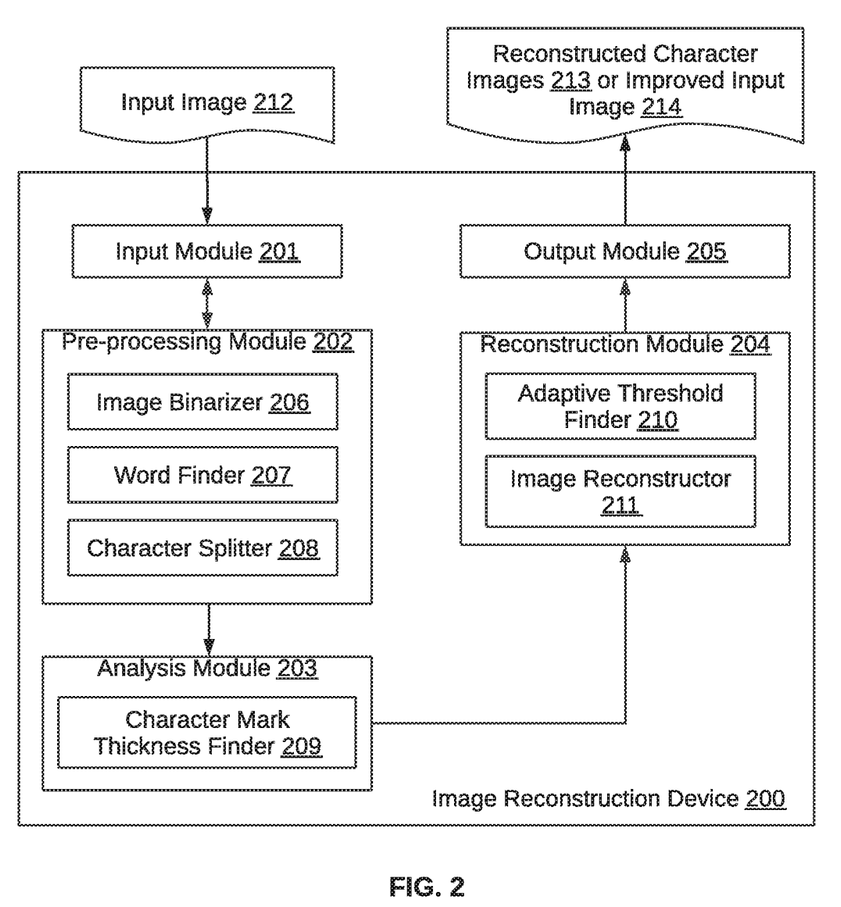
FIG. 2 is a functional block diagram of an image reconstruction device, in accordance with some embodiments of the present disclosure.

Referring now to FIG. 2, a functional block diagram of the image reconstruction device 200 (analogous to the image reconstruction device 101 implemented by the system 100 of FIG. 1) is illustrated, in accordance with some embodiments of the present disclosure. The image reconstruction device 200 may include various modules that perform various functions so as to reconstruct image and, therefore, improve quality of the image. In some embodiments, the image reconstruction device 200 may include an input module 201, a pre-processing module 202, an analysis module 203, a reconstruction module 204, and an output module 205. The pre-processing module 202 may further include image binarizer 206, word finder 207, and character splitter 208. Similarly, the analysis module 203 may include character mark thickness finder 209. Further, the reconstruction module 204 may include adaptive threshold finder 210 and image reconstructor 211.

The input module 201 may receive an input image 212 from a user (e.g., a pre-stored image, a scanned image, etc.), an application (e.g., Adobe Acrobat, MS Paint, Image viewer, etc.) or another device (e.g., scanner, fax machine, camera, image capturing device, etc.). The input module 201 may store the received input image 212 in a database (not shown) implemented on the image reconstruction device 200. In some embodiments, the input module 201 may receive a two-dimensional (2D) image that needs to be reconstructed before being passed to the OCR system.

The pre-processing module 202 may receive the input image 212 directly from the input module 201 or from the database (not shown). The pre-processing module 202 may then pre-process the received input image 212 to generate character images before correcting for distortions in each character image. In some embodiments, the pre-processing module 202 may perform image pre-processing by applying standard signal-processing techniques to the input image 212. In some embodiments, the pre-processing may include, but is not limited to, performing grey-scale conversion of the input image, filtering noise from the greyscale image, correcting orientation of the greyscale image, correcting distortion in the greyscale image, binarizing the greyscale image, segmenting the binarized image to generate word images, segmenting the word images to generate character images, and so forth.

In particular, the image binarizer 206 may binarize the input image 212 to generate a binarized image. In some embodiments, the image binarizer 206 may, first, convert the input image 212 into a greyscale image. The image binarizer 206 may then pre-process the greyscale image to filter-out noise, correct orientation, and correct distortion. The image binarizer 206 may, finally, binarize the greyscale image to generate the binarized image.

Further, the word finder 207 may segment the binarized image into word images corresponding to words in the input image 212. In some embodiments, the word finder 207 may, first, analyze the input image 212 so as to find a bounding box for each word in the binarized image. The word finder 207 may then extract word images. Alternatively, in some embodiments, the word finder 207 may, first, identify text lines in the input image 212. For example, in order to identify the text lines, the word finder 207 may determine contiguous stretches of horizontal non-text pixels in the binarized image (e.g., black pixels in the binarized image). The word finder 207 may then extract text line images. The word finder 207 may then analyze a text line image so as to identify words in the text line image. For example, in order to identify the words, the word finder 207 may determine a number of contiguous stretches of vertical non-text pixels in the text line image (e.g., black pixels in the binarized text line image). The word finder 207 may then extract word images.

Moreover, the character splitter 208 may segment each word image into character images corresponding to each character in the word image and, therefore, in the input image 212. In some embodiments, the character splitter 208 may, first, analyze the word image so as to find a bounding box for each character in the word image. The character splitter 208 may then split character images. Alternatively, in some embodiments, the character splitter 208 may, first, analyze a word image so as to identify characters in the word image. For example, as above, in order to identify the characters, the character splitter 208 may determine a number of contiguous stretches of vertical non-text pixels in the word image (e.g., black pixels in the binarized word image). The character splitter 208 may then extract character images. It should be noted that the number of contiguous stretches of vertical non-text pixels for character segmentation should be less than that for word segmentation. Further, it should be noted that there may be a minimum threshold for the number of contiguous stretches of vertical non-text pixels between two words. However, there may be no minimum threshold or a lesser threshold for the number of contiguous stretches of vertical non-text pixels between two characters. For example, in some embodiments, any number of contiguous stretches of vertical non-text pixels between two characters in the word image may be sufficient to identify the character and extract the character images.

Thus, the word finder 207 in conjunction with the character splitter 208 may provide character images. In some embodiments, the word finder 207 in conjunction with the character splitter 208 may also provide position indices for the character images. As will be appreciated, a position index of a character image may include pixel position of the character image. Alternatively, the position index of the character image may include a line number, a word number, and a character number of the character image within the input image 212.

The analysis module 203 may receive the character images from the pre-processing module 202. The analysis module 203 may then determine any distortion in each of the character images. In particular, the character mark thickness finder 209 may determine a thickness of a character in a character image (also referred to as local character thickness threshold value for the character image). As will be described in greater detail in conjunction with FIG. 4-5, the local character thickness threshold value in the character image may be based on a set of character pixel values in a pre-determined number of segments in the character image. In some embodiments, the local character thickness threshold value in the character image may be a most frequent value among the set of character pixel values in the pre-determined number of segments in the character image. Further, in some embodiments, each of the set of character pixel values may be determined based on a number of continuous character pixels encountered while traversing each of the pre-determined number of segments from one end to another. It should be noted that the character pixels may be pixels that form the character or text (e.g., white pixels in the binarized image). Further, it should be noted that the predetermined number of segments may be pre-defined for the image reconstruction device 200 (i.e., it may pre-set in the image reconstruction device 200), user-defined for the input image 212 (i.e., provided by the user based on her experience and size of characters in the input image 212), or dynamically determined based on a size of the character image (i.e., determined by the image reconstruction device 200 using a set of pre-defined rules).

The reconstruction module 204 may receive the local character thickness threshold value for each character image. The reconstruction module 204 may then reconstruct the character image to a normalized character thickness value based on the local character thickness threshold value in the character image. The reconstruction module 204 may, therefore, mitigating any distortions in the character image. Further, the reconstruction module 204 may reconstruct the input image 212 based on the reconstructed character images 213 to generate an improved input image 214. In particular, the adaptive threshold finder 210 may determine an overall average thickness of character in the input image 212 (also referred to as global character thickness threshold value or adaptive threshold value for the input image 212). As will be described in greater detail in conjunction with FIG. 4, the global character thickness threshold value in the input image 212 may be based on the local character thickness threshold value for each of the character images. In some embodiments, the global character thickness threshold value may be determined based on a most frequent local character thickness threshold value in the input image 212, a second most frequent local character thickness threshold value in the input image 212, and a number of character images.

The global character thickness threshold value may be employed to reconstruct each character image so as to mitigate any distortions and enhance the sharpness. As will be appreciated, in some cases, character thickness will not be proper in different regions of the character image. In such cases, reconstruction may be a challenge, if done only on the basis of the local character thickness threshold value. Hence, the global character thickness threshold value may be employed by the image reconstruction device 200 to reconstruct the character image. The global character thickness threshold value along with the local character thickness threshold value may help in differentiating a bold character from a normal character as well.

The image reconstructor 211 may perform reconstruction of each character image based on the local character thickness threshold value of each character image and the global character thickness threshold value of the input image 212. The image reconstructor 211 may, first, classify the character in the character image as 'bold' or 'not bold' based on the local character thickness threshold value of the character image and the global character thickness threshold value. If the local character thickness threshold value is greater than the global character thickness threshold value, then the character may be classified as 'bold' character, else it is classified as 'not-bold' character.

For each character, the image reconstructor 211 may then compare a number of continuous character pixels in each pixel line of the character image with the local character thickness threshold value of the character image. The pixel line in which the number of continuous character pixels is lesser than the local character thickness threshold value, the image reconstructor 211 may add more pixels to the number of continuous character pixels from a pre-defined end so as to make it equal to the local character thickness threshold value. Conversely, the pixel line in which the number of continuous character pixels is higher than the local character thickness threshold value, the image reconstructor 211 may remove additional pixels from the number of continuous character pixels from an opposite to the pre-defined end so as to make it equal to the local character thickness threshold value.

Further, for each of the non-bold characters, the image reconstructor 211 may compare a number of continuous character pixels in each pixel line of the character image with the global character thickness threshold value of the input image 212. The pixel line in which the number of continuous character pixels is lesser than the global character thickness threshold value, the image reconstructor 211 may add more pixels to the number of continuous character pixels from a pre-defined end so as to make it equal to the global character thickness threshold value. Conversely, the pixel line in which the number of continuous character pixels is higher than the global character thickness threshold value, the image reconstructor 211 may remove additional pixels from the number of continuous character pixels from an opposite to the pre-defined end so as to make it equal to the global character thickness threshold value. In this manner, the image reconstructor 211 may generate reconstructed character images 213 free from any distortions. Additionally, the image reconstructor 211 may perform reconstruction of the input image 212 based on the reconstructed character images 213 so as to generate the improved input image 214.

The output module 205 may receive the reconstructed character images 213 or the improved input image 214 from the reconstruction module 214. The output module 205 may then render the reconstructed character images 213 or the improved input image 214 to the user via the user interface. Alternatively, the output module 205 may provide the reconstructed character images 213 or the improved input image 214 to an external system or an external application. For example, output module 205 may provide the reconstructed character images 213 or the improved input image 214 to the OCR system for performing OCR. As the thickness of the characters in the reconstructed character images 213 or the improved input image 214 is consistent, the OCR will be performed with better accuracy.

It should be noted that the image reconstruction device 200 may be implemented in programmable hardware devices such as programmable gate arrays, programmable array logic, programmable logic devices, or the like. Alternatively, the image reconstruction device 104 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for reconstructing an image. For example, the exemplary system 100 and the associated image reconstruction device 200 may perform image reconstruction by the processes discussed herein. In particular, as will be appreciated by those of ordinary skill in the art, control logic and/or automated routines for performing the techniques and steps described herein may be implemented by the system 100 and the associated image reconstruction device 200, either by hardware, software, or combinations of hardware and software. For example, suitable code may be accessed and executed by the one or more processors on the system 100 and the associated image reconstruction device 200 to perform some or all of the techniques described herein. Similarly, application specific integrated circuits (ASICs) configured to perform some or all of the processes described herein may be included in the one or more processors on the system 100 and the associated image reconstruction device 200.

Figure 3:
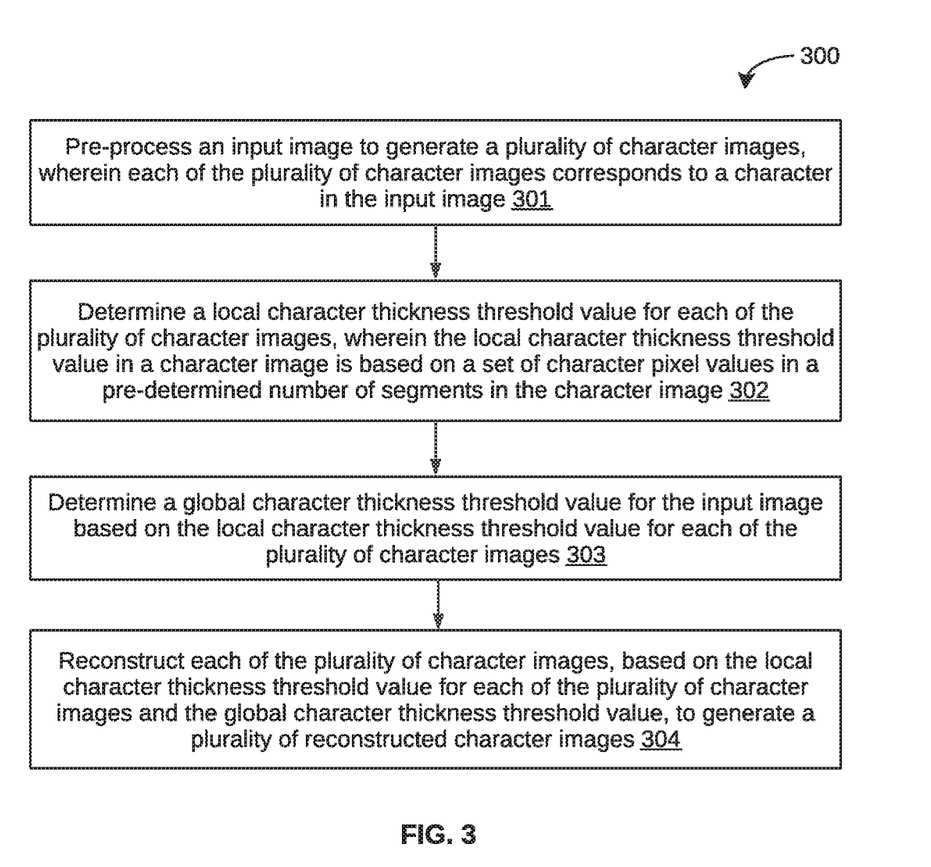
FIG. 3 is a flow diagram of an exemplary process for reconstructing an image, in accordance with some embodiments of the present disclosure.

For example, referring now to FIG. 3, exemplary process 300 for reconstructing an image via a system, such as system 100, is depicted via a flowchart, in accordance with some embodiments of the present disclosure. As illustrated in the flowchart, at step 31, an input image may be pre-processed to generate a plurality of character images. It should be noted that each of the plurality of character images corresponds to a character in the input image. In some embodiments, the input image may be pre-processed by binarizing the input image to generate a binarized image, segmenting the binarized image to generate a plurality of word images, and segmenting each of the plurality of word images to generate the plurality of character images.

At step 302, a local character thickness threshold value may be determined for each of the plurality of character images. It should be noted that the local character thickness threshold value in a character image may be based on a set of character pixel values in a pre-determined number of segments in the character image. In some embodiments, the local character thickness threshold value in the character image may be a most frequent value among the set of character pixel values in the pre-determined number of segments in the character image. Additionally, in some embodiments, each of the set of character pixel values is determined based on a number of continuous character pixels encountered while traversing each of the pre-determined number of segments from one end to another. Further, in some embodiments, the pre-determined number of segments may be pre-defined for the image reconstruction device, user-defined for the input image, or dynamically determined based on a size of the character image.

At step 303, a global character thickness threshold value may be determined for the input image. It should be noted that the global character thickness threshold value in the input image may be based on the local character thickness threshold value for each of the plurality of character images. In some embodiments, the global character thickness threshold value may be determined based on a most frequent local character thickness threshold value for the plurality of character images, a second most frequent local character thickness threshold value for the plurality of character images, and a number of character images.

At step 304, each of the plurality of character images may be reconstructed to generate a plurality of reconstructed character images. Additionally, in some embodiments, the input image may be reconstructed, based on the plurality of reconstructed character images, to generate an improved input image. It should be noted that each of the plurality of character images may be reconstructed based on the local character thickness threshold value for each of the plurality of character images and the global character thickness threshold value. In some embodiments, the character image is reconstructed by adjusting a number of continuous character pixels in each pixel line of the character image based on the local character thickness threshold value and global character thickness threshold value. Thus, in such embodiments, the number of continuous character pixels in a pixel line of the character image may be increased (i.e., existing non-character pixels are made character pixels), from a pre-defined end (say, from left), if the number of continuous character pixels in the pixel line is less than at least one of the local character thickness threshold value and the global character thickness threshold value. Further, in such embodiments, the number of continuous character pixels in a pixel line of the character image may be decreased (i.e., existing character pixels are made non-character pixels), from an opposite to the pre-defined end (say, from right), if the number of continuous character pixels in the pixel line is more than at least one of the local character thickness threshold value and the global character thickness threshold value.

It should be noted that, in some embodiments, the local character thickness threshold value for each of the plurality of character images and the global character thickness threshold value for the input image is determined for horizontal segments as well as for vertical segments. Further, it should be noted that, in such embodiments, the distortion in each of the plurality of character images may be reconstructed for horizontal direction as well as for vertical direction.

Figure 4:
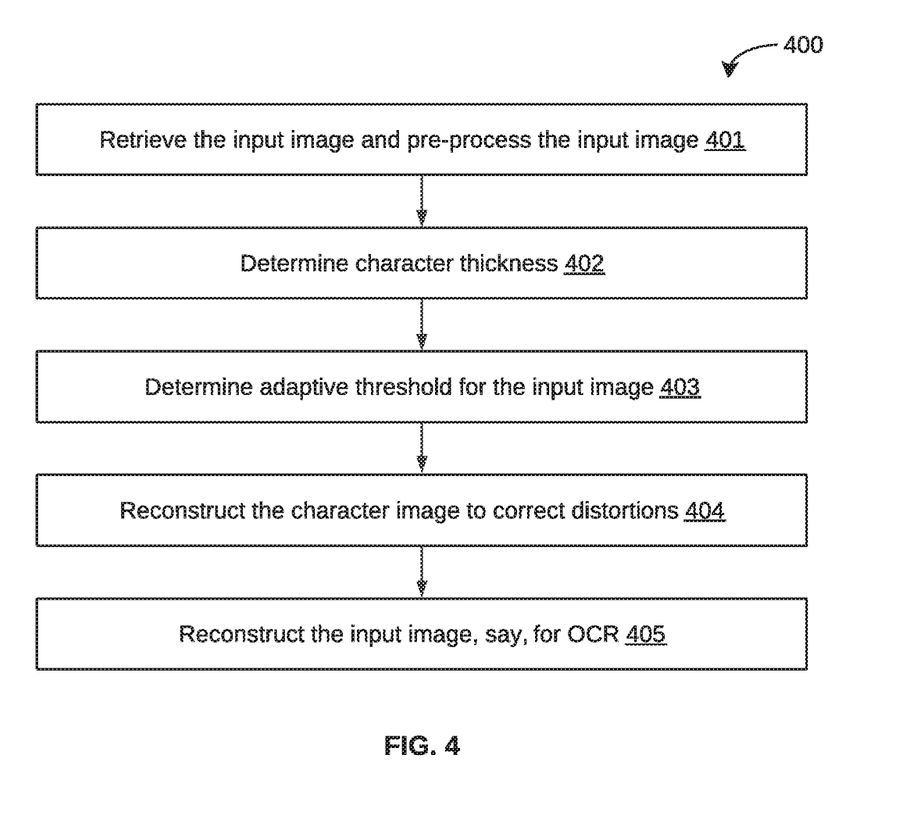
FIG. 4 is a flow diagram of a detailed exemplary process for reconstructing an image, in accordance with some embodiments of the present disclosure.

Referring now to FIG. 4, exemplary process 400 for reconstructing an image is depicted in greater detail, via a flowchart, in accordance with some embodiments of the present disclosure. As illustrated in the flowchart, at step 401, the input module 201 may receive the input image 212 from the user. Further, the pre-processing module 202 may receive the input image 212 from the input module 201. The pre-processing module 202 may then pre-process the input image 212 to generate character images corresponding to characters in the input image 212. The pre-processing module 202 may employ the image binarizer 206 to binarize the input image 212. The input image 212 may be first converted to a grey scale image and then binarized. The pre-processing module 202 may then employ the word finder 207 to segment the binarized input image into word images corresponding to words in the input image 212. The pre-processing module 202 may further employ the character splitter 208 to split each word images into character images.

Figure 5A:
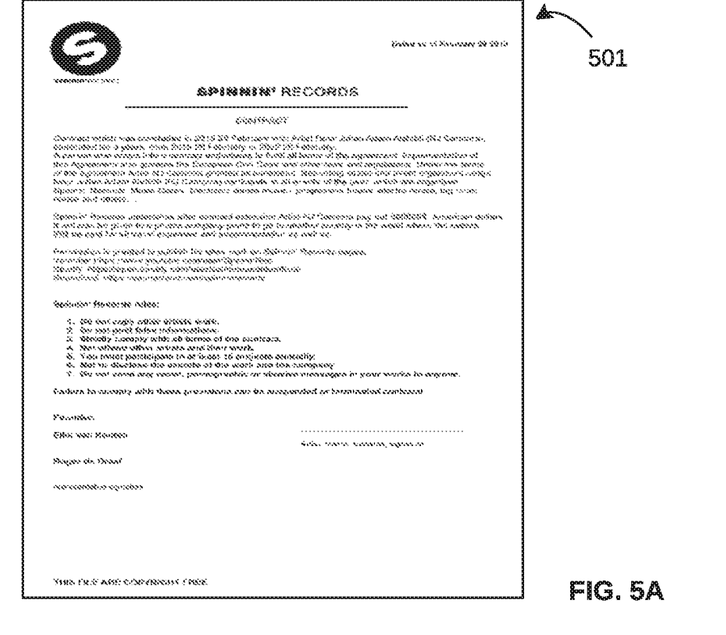
FIGS. 5A-5D illustrate an exemplary example of generating a character image and determining a local character thickness threshold value for the character image, in accordance with some embodiments of the present disclosure.
Figure 5B:
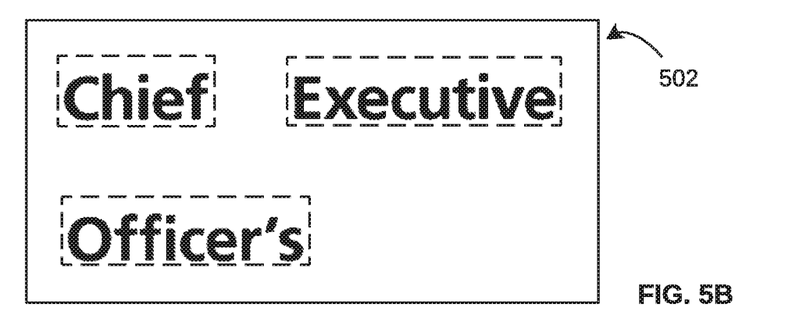
Figure 5C:
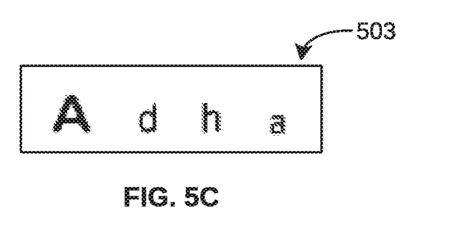

Referring now to FIGS. 5A-5C, an exemplary example of generating a character image is illustrated, in accordance with some embodiments of the present disclosure. As illustrated, a contract document 501 may be fed to the pre-processing module 202 via the input module 201. As discussed above, the image binarizer 206 may, first, convert the contract document 501 into a grey scale image and, then, binarize the grey scale image to generate a binarized image. Further, the word finder 207 may segment the binarized image into word images 502 corresponding to words in the contract document 501. In some embodiments, the word finder 207 may employ Voronoi diagram algorithm, Hough transform, etc. to segment the binarized image into word images 502. Further, the character splitter 208 split each of the word image 502 into character images 503 corresponding to characters in the word image 502. In some embodiments, the character splitter 208 may employ vertical histogram algorithm, space-based algorithms, etc. to segment each word image 502 into character images 503.

Referring back to FIG. 4, at step 402, the analysis module 203 may receive the character images from the pre-processing module 202. The analysis module 203 may then determine thickness of character in each of the character images. The analysis module 203 may employ the character mark thickness finder 209 to determine a local character thickness threshold value for each of the character images. The character mark thickness finder 209 may, first, divide each character image into a pre-determined number of segments or lines (say, 'n' segments or 'n' lines). As discussed above, the number of segments/lines may be pre-defined (say, 6), user-defined, or dynamically determined (say, half of image resolution). Further, in some embodiments, the number of segments/lines may be changed, based on the image resolution, to get more precise values. However, it should be noted that the maximum number of segments/lines may be limited to number of pixels in the character image. For each of these segments/lines, the character mark thickness finder 209 may scan the character image along the segments/lines from any direction. Thus, for example, if the lines are drawn horizontally, the character mark thickness finder 209 may scan the character image horizontally. Similarly, for example, if the lines are drawn vertically, the character mark thickness finder 209 may scan the character image vertically. The most frequently occurring width for character (i.e., number of continuous character pixels that occur most frequently) in a character image may be considered as the local character thickness threshold value for that character image.

Figure 5D:
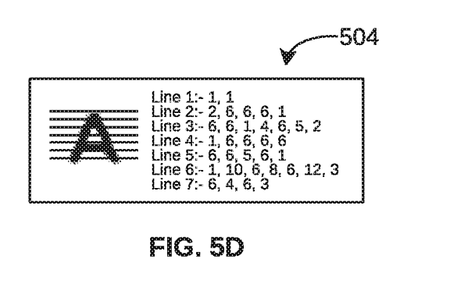

Referring now to FIG. 5D, an exemplary example of determining the local character thickness threshold value for the character image is illustrated, in accordance with some embodiments of the present disclosure. As illustrated, the character image representing character 'A' (also referred to as character image 'A' 504), in its binarized form, may be segmented with 7 horizontal lines. For each of these lines, the character mark thickness finder 209 may scan the character image 'A' 504 along each of the horizontal lines starting from a left end. Thus, for example, for line 1, the character mark thickness finder 209 may scan the character image 'A' 504 horizontally and encounter only two white pixel groups (each '1' pixel wide (probably noise)). Similarly, for line 2, the character mark thickness finder 209 may scan the character image 'A' 504 horizontally and encounter five white pixel groups (one being '2' pixels wide (probably noise), three being '6' pixels wide (probably characters pixels), and last one being '1' pixel wide (probably noise). As discussed above, the white pixels, forming part of character 'A' in the binarized character image, are the character pixels. In this fashion, the character mark thickness finder 209 may scan each of the '7' lines. In the illustrated example, the most repeated value for the character image 'A' 504 is '6'. Thus, the local character thickness threshold value for the character image 'A' 504 may be considered as 6. As will be appreciated, the character mark thickness finder 209 may determine the local character thickness threshold value for each of the character images in the input image. It should be noted that if the lines are drawn vertically, for example, the character mark thickness finder 209 may scan the character image vertically.

As discussed above, the local character thickness threshold value of any given character image may help the reconstruction module 204 to reconstruct that character image. In particular, the local character thickness threshold value of any given character image may be compared with the global character thickness threshold value to remove distortions and get better sharpness in that character image. The reconstructed character images are of improved quality. The improved quality may be beneficial in a variety of application. For example, the improved image quality may enable the OCR system to give better accuracy while performing the OCR.

Referring back to FIG. 4, at step 403, the reconstruction module 204 may receive the local character thickness threshold value for each of the character images from the analysis module 203. The reconstruction module 204 may then employ the adaptive threshold finder 210 to determine the global character thickness threshold value (i.e., the adaptive threshold value) for the input image 212. In some embodiments, the adaptive threshold finder 210 may determine the global character thickness threshold value (T) for the input image 212 based on the local character thickness threshold values for the character images extracted from the input image 212 as follows:

$$\text{if } S \geq \frac{F}{m}, \text{ then } T = S, \text{ else } T = F \qquad \text{Equation (1)}$$

where, S is the second most occurring local character thickness threshold value, F is the first most occurring local character thickness threshold value, and m is the number of character images extracted from the input image 212.

At step 404, the reconstruction module 204 may reconstruct each of the character images to remove any distortions. The reconstruction module 204 may employ the image reconstructor 211 to classify the character in the character image as 'bold' or 'not bold' based on the local character thickness threshold value of the character image and the global character thickness threshold value. If the local character thickness threshold value is greater than T, then the character may be classified as 'bold' character, else it may be classified as 'not-bold' character.

The image reconstructor 211 may then compare thickness values at different points in each pixel line of the character image with the local character thickness threshold value of the character image ($T_C$). The image reconstructor 211 may further adjust the thickness values at different points in each pixel line of the character image based on the comparison. For example, in some embodiments, if the thickness value at a point in a pixel line is greater than $T_C$ and less than about 1.5 times of $T_C$, then the image reconstructor 211 may convert additional character pixels (say, represented by '1' in the binarized image) at that point to non-character pixels (i.e., made '0') from a right side so as to equalize it to the value of $T_C$. In other words, if the thickness value at a point is higher than the local character thickness threshold value, then the character pixels are removed or decreased at that point to make the thickness value at that point equal to the local character thickness threshold value. Similarly, if the thickness value at a point in a pixel line is less than $T_C$ and greater than about 0.5 times of $T_C$, then the image reconstructor 211 may convert non-character pixels (say, represented by '0' in the binarized image) at that point to character pixels (i.e., made '1') from a left side to equalize it to the value of $T_C$. In other words, if the thickness value at a point is less than the local character thickness threshold value, then the character pixels are added or increased at that point to make the thickness value at that point equal to the local character thickness threshold value. Further, if the thickness value at a point in a pixel line is less than about $0.5T_C$ or greater than about $1.5T_C$, then the image reconstructor 211 may ignore such points (i.e., may not take any action at such points).

Further, for each of the not-bold' characters, the image reconstructor 211 may compare thickness values at different points in each pixel line of the character image with the global character thickness threshold value of the input image 212. The image reconstructor 211 may further adjust the thickness values at different points in each pixel line of the character image based on the comparison. For example, in some embodiments, if the thickness value at a point in a pixel line is greater than T and less than about 1.5 times of T, then the image reconstructor 211 may convert additional character pixels (say, represented by '1' in the binarized image) at that point to non-character pixels (i.e., made '0') from a right side so as to equalize it to the value of T. In other words, if the thickness value at a point is higher than the global character thickness threshold value, then the character pixels are removed or decreased at that point to make the thickness value at that point equal to the global character thickness threshold value. Similarly, if the thickness value at a point in a pixel line is less than T and greater than about 0.5T, then the image reconstructor 211 may convert non-character pixels (say, represented by '0' in the binarized image) at that point to character pixels (i.e., made '1') from a left side to equalize it to the value of T. In other words, if the thickness value at a point is less than the global character thickness threshold value, then the character pixels are added or increased at that point to make the thickness value at that point equal to the global character thickness threshold value. Further, if the thickness value at a point in a pixel line is less than about 0.5T or greater than about 1.5T, then the image reconstructor 211 may ignore such points (i.e., may not take any action at such points). In this manner, the image reconstructor 211 may generate reconstructed character images 213 with uniform thickness and, therefore, free from any distortions.

At step 405, the reconstruction module 204 may reconstruct the input image 212. The image reconstructor 211 may perform reconstruction of the input image 212 based on the reconstructed character images 213 so as to generate the improved input image 214. The reconstructed character images 213 and/or the improved input image 214 may be provided to the output module 205. In some embodiments, the output module 205 may render the reconstructed character images 213 and/or the improved input image 214. Alternatively, in some embodiments, the output module 205 may provide the reconstructed character images 213 and/or the improved input image 214 to an external system/application, such as, OCR system for performing OCR. As each character in the reconstructed character images 213 or the improved input image 214 is sharper and has consistent thickness in comparison to that of input image 212, the number of wrong predictions in the OCR is reduced. Thus, the text conversion accuracy of the OCR is increased.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
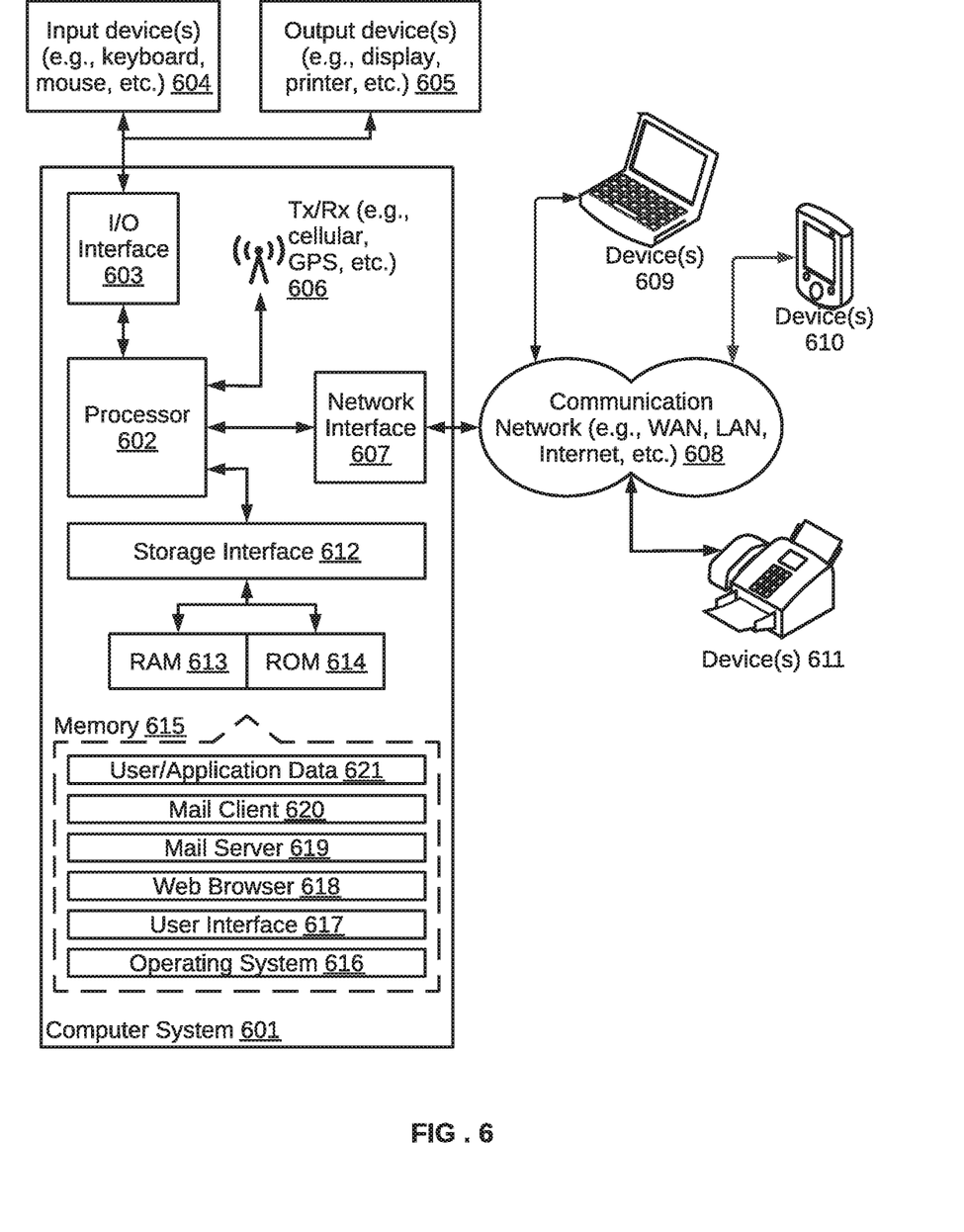
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 for performing image reconstruction. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor 602 may include specialized processing units such as integrated system (bus) controllers, memory management control units, floating point units, graphics processing units, digital signal processing units, etc. The processor 602 may include a microprocessor, such as AMD® ATHLON® microprocessor, DURON® microprocessor or OPTERON® microprocessor, ARM's application, embedded or secure processors, IBM® POWERPC®, INTEL'S CORE® processor, ITANIUM® processor, XEON® processor, CELERON® processor or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., TEXAS® INSTRUMENTS WILINK WL1283® transceiver, BROADCOM® BCM4750IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface 607 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 902 may itself embody one or more of these devices.

In some embodiments, the processor 602 may be disposed in communication with one or more memory devices 615 (e.g., RAM 613, ROM 614, etc.) via a storage interface 612. The storage interface may connect to memory devices 615 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, INTEL® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 615 may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® iOS® platform, GOOGLE® ANDROID® platform, BLACKBERRY® OS platform, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, the computer system 601 may implement a web browser 618 stored program component. The web browser may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, the computer system 601 may implement a mail server 619 stored program component. The mail server may be an Internet mail server such as MICROSOFT® EXCHANGE® mail server, or the like. The mail server may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. The mail server 619 may utilize communication protocols such as Internet message access protocol (IMAP), messaging application programming interface (MAPI), MICROSOFT® EXCHANGE®, post office protocol (POP), simple mail transfer protocol (SMTP), or the like. In some embodiments, the computer system 601 may implement a mail client 620 stored program component. The mail client may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 601 may store user/application data 621, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

The techniques described in the various embodiments discussed above provide for efficient, effective, and robust reconstruction of image so as to improve the quality of the image. The improved image is generally free from distortions, has increased sharpness, and has consistent character thickness. The techniques further provide for intelligence to classify character as 'bold' or not 'bold' and to differentiate between the character and noise. Additionally, the techniques generally work independent of the language and font of characters in the image or adapt to any kind of font from any language. Further, the techniques described above may be easily deployed in any cloud-based servers for access and use as an 'application as a service' by any computing device including mobile device. For example, the image reconstruction device 101 may be implemented on a cloud-based server and used for optimizing/improving images over mobile device application. Moreover, the techniques described in the various embodiments discussed above provide for improved OCR accuracy. The improved input image or reconstructed character images that is free from any distortions and has consistent character thickness result in a high recognition accuracy in any OCR extraction.

The specification has described system and method for reconstructing image. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium"

should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for reconstructing an image, the system comprising:
   a processor; and
   a memory communicatively coupled to the processor, wherein the memory stores processor-executable instructions, which, on execution, causes the processor to:
   pre-process an input image to generate a plurality of character images, wherein each of the plurality of character images corresponds to a character in the input image;
   determine a local character thickness threshold value for each of the plurality of character images, wherein the local character thickness threshold value in a character image is based on a set of character pixel values in a pre-determined number of segments in the character image;
   determine a global character thickness threshold value for the input image based on the local character thickness threshold value for each of the plurality of character images; and
   reconstruct each of the plurality of character images, based on the local character thickness threshold value for each of the plurality of character images and the global character thickness threshold value, to generate a plurality of reconstructed character images.

2. The system of claim 1, wherein the processor pre-processes the input image by:
   binarizing the input image to generate a binarized image;
   segmenting the binarized image to generate a plurality of word images; and
   segmenting each of the plurality of word images to generate the plurality of character images.

3. The system of claim 1, wherein the pre-determined number of segments is pre-defined for the image reconstruction device, user-defined for the input image, or dynamically determined based on a size of the character image; and wherein each of the set of character pixel values is determined based on a number of continuous character pixels encountered while traversing each of the pre-determined number of segments from one end to another.

4. The system of claim 1, wherein the local character thickness threshold value in the character image is a most frequent value among the set of character pixel values in the pre-determined number of segments in the character image.

5. The system of claim 1, wherein the global character thickness threshold value is determined based on a most frequent local character thickness threshold value for the plurality of character images, a second most frequent local character thickness threshold value for the plurality of character images, and a number of character images.

6. The system of claim 1, wherein the processor reconstructs the character image by:
   increasing, from a pre-defined end, a number of continuous character pixels in each pixel line of the character image if the number of continuous character pixels is less than at least one of the local character thickness threshold value and the global character thickness threshold value; and
   decreasing, from an opposite to the pre-defined end, a number of continuous character pixels in each pixel line of the character image if the number of continuous character pixels is more than at least one of the local character thickness threshold value and the global character thickness threshold value.

7. The system of claim 1, wherein the processor-executable instructions, on execution, further causes the processor to re-construct the input image, based on the plurality of reconstructed character images, to generate an improved input image.

8. A method of reconstructing an image, the method comprising:
   pre-processing, by an image reconstruction device, an input image to generate a plurality of character images, wherein each of the plurality of character images corresponds to a character in the input image;
   determining, by the image reconstruction device, a local character thickness threshold value for each of the plurality of character images, wherein the local character thickness threshold value in a character image is based on a set of character pixel values in a pre-determined number of segments in the character image;
   determining, by the image reconstruction device, a global character thickness threshold value for the input image based on the local character thickness threshold value for each of the plurality of character images; and
   reconstructing, by the image reconstruction device, each of the plurality of character images, based on the local character thickness threshold value for each of the plurality of character images and the global character thickness threshold value, to generate a plurality of reconstructed character images.

9. The method of claim 8, wherein pre-processing the input image comprises:
   binarizing the input image to generate a binarized image;
   segmenting the binarized image to generate a plurality of word images; and
   segmenting each of the plurality of word images to generate the plurality of character images.

10. The method of claim 8, wherein the pre-determined number of segments is pre-defined for the image reconstruction device, user-defined for the input image, or dynamically determined based on a size of the character image; and wherein each of the set of character pixel values is determined based on a number of continuous character pixels encountered while traversing each of the pre-determined number of segments from one end to another.

11. The method of claim 8, wherein the local character thickness threshold value in the character image is a most frequent value among the set of character pixel values in the pre-determined number of segments in the character image.

12. The method of claim 8, wherein the global character thickness threshold value is determined based on a most frequent local character thickness threshold value for the plurality of character images, a second most frequent local character thickness threshold value for the plurality of character images, and a number of character images.

13. The method of claim 8, wherein reconstructing the character image comprises:
   increasing, from a pre-defined end, a number of continuous character pixels in each pixel line of the character image if the number of continuous character pixels is less than at least one of the local character thickness threshold value and the global character thickness threshold value; and decreasing, from an opposite to the pre-defined end, a number of continuous character pixels in each pixel line of the character image if the number of continuous character pixels is more than at least one of the local character thickness threshold value and the global character thickness threshold value.

14. The method of claim 8, further comprising re-constructing the input image, based on the plurality of reconstructed character images, to generate an improved input image.

15. A non-transitory computer-readable medium storing computer-executable instructions for:

pre-processing an input image to generate a plurality of character images, wherein each of the plurality of character images corresponds to a character in the input image;

determining a local character thickness threshold value for each of the plurality of character images, wherein the local character thickness threshold value in a character image is based on a set of character pixel values in a pre-determined number of segments in the character image;

determining a global character thickness threshold value for the input image based on the local character thickness threshold value for each of the plurality of character images; and reconstructing each of the plurality of character images, based on the local character thickness threshold value for each of the plurality of character images and the global character thickness threshold value, to generate a plurality of reconstructed character images.

16. The non-transitory computer-readable medium of claim 15, wherein pre-processing the input image comprises:

binarizing the input image to generate a binarized image;

segmenting the binarized image to generate a plurality of word images; and segmenting each of the plurality of word images to generate the plurality of character images.

17. The non-transitory computer-readable medium of claim 15, wherein the pre-determined number of segments is pre-defined for the system, user-defined for the input image, or dynamically determined based on a size of the character image; and wherein each of the set of character pixel values is determined based on a number of continuous character pixels encountered while traversing each of the pre-determined number of segments from one end to another.

18. The non-transitory computer-readable medium of claim 15, wherein the local character thickness threshold value in the character image is a most frequent value among the set of character pixel values in the pre-determined number of segments in the character image.

19. The non-transitory computer-readable medium of claim 15, wherein the global character thickness threshold value is determined based on a most frequent local character thickness threshold value for the plurality of character images, a second most frequent local character thickness threshold value for the plurality of character images, and a number of character images.

20. The non-transitory computer-readable medium of claim 15, wherein reconstructing the character image comprises:

increasing, from a pre-defined end, a number of continuous character pixels in each pixel line of the character image if the number of continuous character pixels is less than at least one of the local character thickness threshold value and the global character thickness threshold value; and decreasing, from an opposite to the pre-defined end, a number of continuous character pixels in each pixel line of the character image if the number of continuous character pixels is more than at least one of the local character thickness threshold value and the global character thickness threshold value.

\* \* \* \* \*